(12) United States Patent
Oxford

(10) Patent No.: US 6,212,199 B1
(45) Date of Patent: Apr. 3, 2001

(54) APPARATUS AND METHOD FOR INTERPRETATION AND TRANSLATION OF SERIAL DIGITAL AUDIO TRANSMISSION FORMATS

(75) Inventor: William V. Oxford, Austin, TX (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 08/819,958

(22) Filed: Mar. 18, 1997

(51) Int. Cl.$^7$ ........................................................ H04J 3/16
(52) U.S. Cl. ............................ 370/466; 370/487; 370/490; 370/522
(58) Field of Search ................................... 370/465, 466, 370/467, 522, 472, 487, 490; 395/200.2, 200.21, 200.17

(56) References Cited

U.S. PATENT DOCUMENTS

| | | | |
|---|---|---|---|
| 3,838,395 | * 9/1974 | Suttill | 340/149 A |
| 4,251,688 | * 2/1981 | Furner | 381/18 |
| 4,757,518 | 7/1988 | Lagadec . | |
| 5,057,947 | 10/1991 | Shimada . | |
| 5,097,364 | 3/1992 | Goto et al. . | |
| 5,258,999 | 11/1993 | Wernimont et al. . | |
| 5,341,374 | * 8/1994 | Lewen et al. | 370/450 |
| 5,381,529 | * 1/1995 | Matsushima | 395/275 |
| 5,532,556 | 7/1996 | Anderson et al. . | |
| 5,577,044 | 11/1996 | Oxford . | |
| 5,684,954 | * 11/1997 | Kaiserswerth | 395/200.2 |

OTHER PUBLICATIONS

Knapp, "A Family Of AES–EBU Interface Devices", 89th AES Convention, Los Angeles, Sep. 1990, pp. 8–79 to 8–91.
Philips Semiconductors, "Digital Audio Input/Output Circuit (DAIO)," TDA1315H, Aug. 1994, pp. 1076–1107.
Inter–IC I$^2$S Sound, "Audio Digital Input Circuit (ADIC)," SAA7274, Jul. 1991, pp. 579–589.
Standards of Electronic Industries Association of Japan, CP–340, "Digital Audio Interface," published by Engineering Department Electronic Industries Association of Japan, Sep. 1987, pp. 1–30.
Audio Engineering Society, Inc., "AES Recommended Practice for Digital Audio Engineering—Serial Transmission Format for Linearly Represented Digital Audio Data," AES3–1985 (ANSI S4.40–1985), 1985, pp.1–9.
Sanchez et al., "Overview of Digital Audio Interface Data Structures," Crystal Semiconductor Corporation, AES/EBU Interface, Mar. 1992, pp. 8–93 to 8–100.
British Standard, "Digital Audio Interface," BS EN 60958: 1995, BS 7239: 1989, IEC 958: 1989, 1994, 68 pages.

* cited by examiner

Primary Examiner—Hassan Kizou
Assistant Examiner—Mitchell Slavitt
(74) Attorney, Agent, or Firm—Burns, Doane, Swecker & Mathis, L.L.P.

(57) ABSTRACT

A method and apparatus for processing digital audio data comprises remapping channel status information in an input digital audio bit stream into a uniform format. The channel status information in the uniform format contains a super-set of data included in the channel status block of the original data and comprises a "higher level" form of presentation than the original status information, thereby reducing the amount of processing required by the application program in interpreting the audio data. The translation of audio data between different formats is performed in an interface unit. The interface unit strips the channel status information from the incoming digital audio data, translates the channel status information into a desired form, and then presents the audio data and the translated channel status information to a host computer for further processing or storage. The translation and routing functions performed by the interface unit are controlled by data stored in one or more registers. The contents of the register(s), in turn, can be set and/or interrogated by transmitting commands to the registers over a serial audio interface line.

21 Claims, 3 Drawing Sheets

APPARATUS AND METHOD FOR INTERPRETATION AND TRANSLATION OF SERIAL DIGITAL AUDIO TRANSMISSION FORMATS

BACKGROUND

The present invention relates generally to a method and apparatus for processing serial audio digital data, and more particularly, to a method and apparatus for interpreting and translating both audio and non-audio information contained within the serial data transmission.

The electronics industry currently offers a wide variety of digital audio devices, including compact disc players, digital audio tape players (DATs), digital sound samplers, digital signal mixers, various types of musical instruments, synthesizers, digital audio sound VCR players, etc. The digital audio data generated and/or received by these devices typically consists of a digital audio portion containing the audio data itself, and a number of auxiliary bits which define various attributes of the audio data, such as whether the data is copyrighted, or has undergone emphasis. The format and content of the auxiliary portion of the data often differs to varying degrees from one device to the next. This makes it difficult to directly communicate information between these different types of devices, and consequently reduces the versatility of these devices.

In attempt to solve this problem, various standards have been proposed for the formatting and transmission of serial digital audio, such as the EIAJ CP-340 standard, published in "Digital Audio Interface", CP-340, Electronic Industries Association of Japan, Sep. 1987, which is incorporated herein in its entirety by reference. As shown in FIG. 1, this standard defines a technique which transmits the serial audio data in units of frames. Each frame comprises two sub-frames, each comprising 32 bits of information. As shown in FIG. 2, the sub-frame itself includes a 4-bit preamble. Preambles are a specific pattern providing synchronization and identification of the sub-frames. For instance, a pre-amble "X" identifies that the subsequent serial data pertains to channel A, a preamble "Y" identifies that the subsequent serial data pertains to channel B, and a preamble "Z" identifies the start of a new block of data. A preamble "Z" occurs every 192 frames.

Bits 4–27 carry the audio sample data in linear 2's complement representation, with bit 27 serving as the most significant bit. The first four bits of this sample can be allocated for auxiliary data. Bit 28 comprises a validity flag. This flag is set to logical "0" when the audio data is reliable and set to logical "1" if unreliable, which, in turn, is determined on the basis of whether the previous audio sample bits were secure and error free. Bit 29 comprises a bit of user data, while bit 31 is a parity bit which reflects whether the information in the subframe has even or odd parity.

Bit 30 provides channel status information. The aggregate of channel status bits over an entire block (192 frames) can be conceptualized as a "channel status block" of information, consisting of twenty-four 8-bit bytes. The first entry in the block reflects whether the audio data is in a professional format or in a consumer format. FIG. 3 shows an exemplary channel status block for the consumer mode, where the consumer mode is indicated in the first bit of the block (PRO="0" for consumer mode).

The remainder of the first byte in the block shown in FIG. 3 includes an audio bit which identifies whether the data contained in the "audio" field is linear PCM audio information or data in some other format. The copy bit (bit 2) identifies whether the data is copyright inhibited or not. The pre-emphasis bits (bits 3–5) identify whether the audio data has been subject to preemphasis prior to transmission. The mode bits (bits 6 and 7) define subsequent bytes 1–3 of the block, and therefore govern the interpretation of these bytes.

In the second byte of information, bits 0–6 provide a category code, which identifies the type of equipment from which the serial audio data is being transmitted, while bit 7 provides information regarding whether the information is an original or a digital copy of a prerecorded work. The third byte includes bits 0–3 which identify a source number of the digital audio data and bits 4–7 which identify a channel number of the data. The fourth byte includes bits 0–3 which identify the sample frequency (44.1 kHz, 48 kHz, or 32 kHz), and bits 4 and 5 which identify the clock accuracy. The interested reader is referred to the above identified EIAJ text, incorporated here by reference, for a more detailed discussion of the myriad of coding permutations in the channel status block for different modes.

While the use of a standardized protocol (such as the EIAJ CP-340) promotes compatibility between different devices, the industry has not settled on a single protocol. Other well known serial digital audio standards include the IEC-958 standard, the EBU standard, the S/P-DIF standard, the I$^2$S (Philips) standard, and the AES standard. Many of these standards use the same general blocktype organization as the CP-340 standard discussed above. Nevertheless, there are differences in the choice and presentation of the channel status information which frustrate attempts to interface devices which employ these different standards. For example, formats may differ by excluding one or more channel status fields. For instance, the AES/EBU standard does not provide the "COPY" and "L" bit information contained in the EIAJ standard (shown in FIG. 3), although the audio data portion of the format is identical.

The prior art has attempted to accommodate this wide array of standards (and also different modes within standards, such as the consumer and professional modes) by designing interface circuits specifically tailored for different types of audio formatting. Other manufacturers have attempted to integrate separate circuits pertaining to different audio input protocols in one chip package. These devices typically require the system integrator to reconfigure the circuitry differently depending on the required input mode, such as by activating necessary circuit components and redefining the function and contents of various control and status registers. However, providing a separate circuit module for each protocol increases the complexity of the circuit. This results in systems which are relatively expensive. Also, the rapid pace at which the industry redefines and updates its standards limits the market lifetime of these devices.

The information coded in the channel status block is also a fairly low-level description of the data being transmitted. For this reason, when an application program attempts to interpret the audio data, it often must perform time consuming processing of the audio channel status information. In some standards, for instance, an application program must successively investigate various attributes and permutations of the status block bits in order to ascertain whether digital copying is permitted, such as by analyzing the category code, the copyright bit and the original/copy bit. In some instances, the software interface must determine the rate of change of various bits in the channel status block. This detracts from the efficiency of the application program, and imposes additional complexity on the software design (such as by requiring separate subroutines to process incoming audio data having different respective protocols).

For at least the above stated reasons, it would be desirable to provide a serial audio interface which allowed a device using one type of audio protocol to communicate with another device using a different type of audio protocol. Furthermore, it would be desirable to reduce some of the processing steps required by an application program in accessing and interpreting digital audio data.

SUMMARY

These and other exemplary objectives are achieved according to the present invention by translating auxiliary data (i.e. non-audio data) in an input digital audio bit stream into a uniform format. This auxiliary information is commonly referred to as "channel status" data or information. The channel status information in the uniform format contains a super-set of data included in the channel status block of the original data and defines a "higher level" form of presentation than the original status information, thereby reducing the amount of processing required by the application program in interpreting the audio data. In this sense, using OSI terminology, the translation of the original status block information into this "higher level" format can be viewed as imposing an additional layer on top of the physical layer and data link layer provided by the audio device. The remapping of channel status information can specifically be conceptualized as providing network and presentation layers to the preexisting physical and data link layers.

According to exemplary aspects of the present invention, the translation of audio data between different formats is performed in an interface unit. The interface unit strips the channel status information from the incoming digital audio data, translates the channel status information into a desired form, and then presents the audio data and the translated channel status information to a host computer for further processing or storage. The translation and routing functions performed by the interface unit are controlled by data stored in one or more registers.

BRIEF DESCRIPTION OF THE DRAWINGS

The foregoing, and other, objects, features and advantages of the present invention will be more readily understood upon reading the following detailed description in conjunction with the drawings in which.

DETAILED DESCRIPTION

Figure 1:
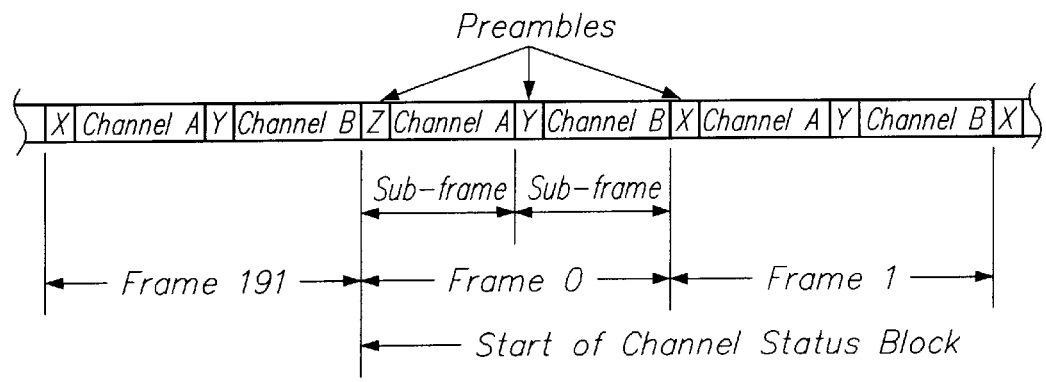
FIGS. 1–2 show the frame/subframe formatting employed by a prior art audio standard.
Figure 2:
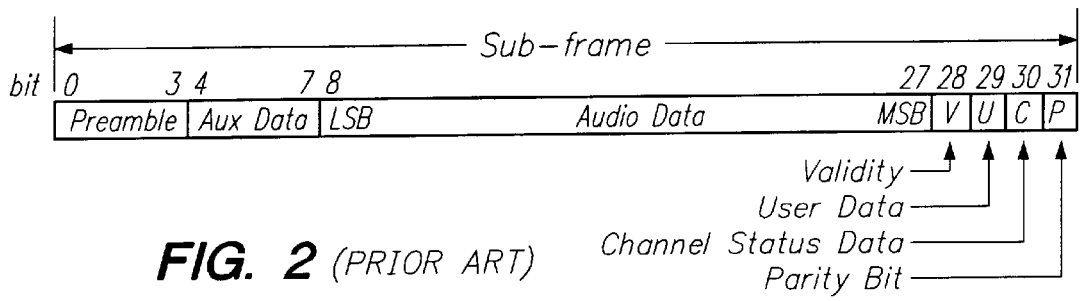
Figure 3:
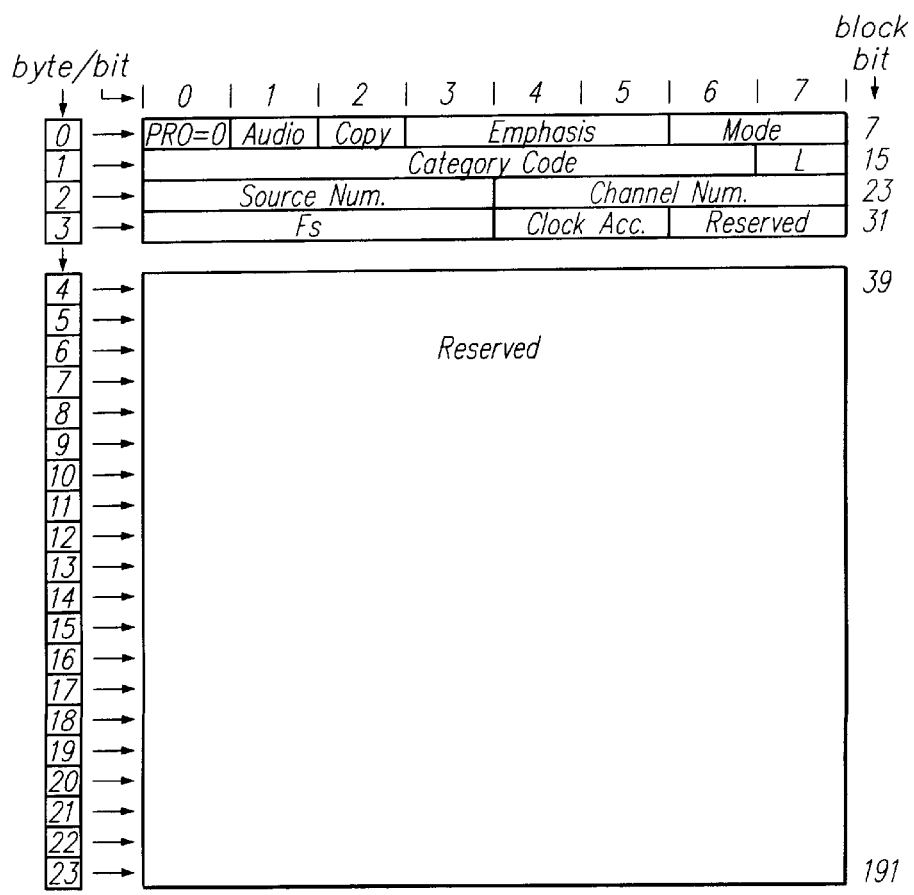
FIG. 3 shows a channel status block for a consumer mode employed by a prior art audio standard.

In the following description, for purposes of explanation and not limitation, specific details are set forth in order to provide a thorough understanding of the invention. However it will be apparent to one skilled in the art that the present invention may be practiced in other embodiments that depart from these specific details. In other instances, detailed descriptions of well-known methods, devices, and circuits are omitted so as not to obscure the description of the present invention with unnecessary detail. In the drawings, like numerals represent like features.

A. Overview

Figure 4:
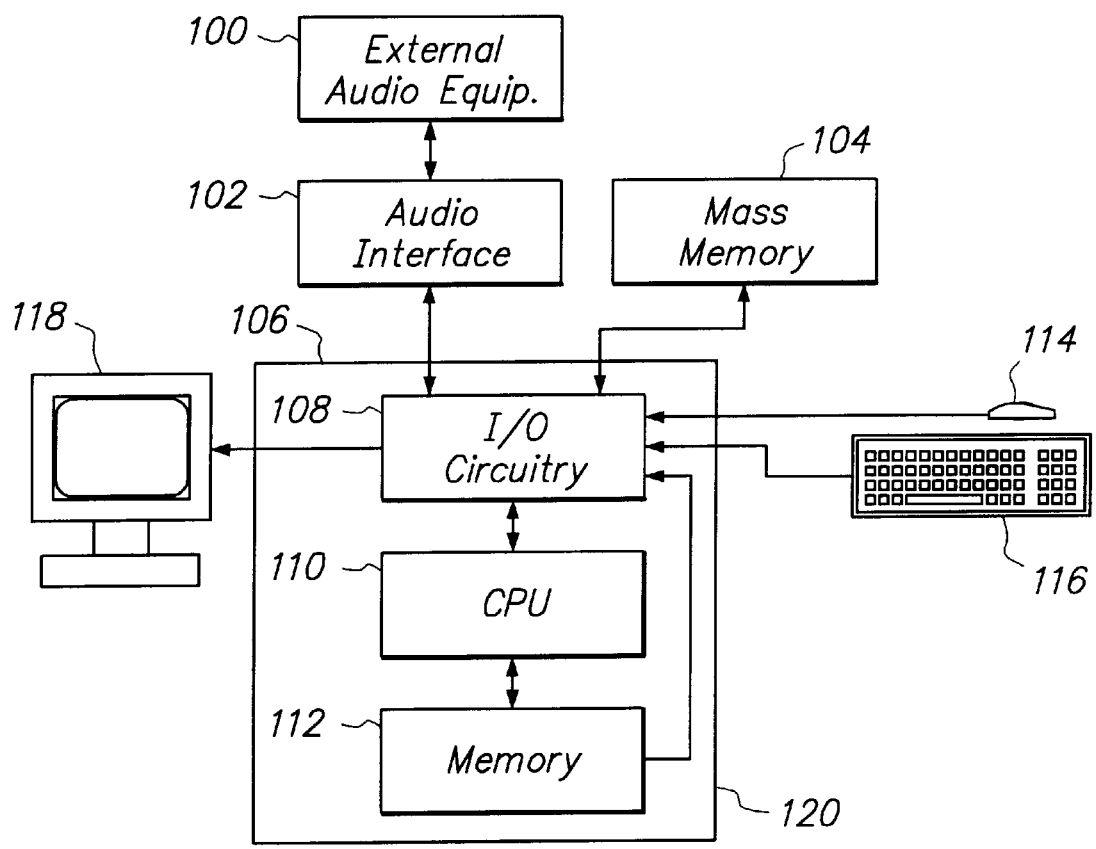
FIG. 4 shows an overview of a computer system including an audio interface unit according to an exemplary embodiment of the present invention.

FIG. 4 shows an exemplary system for interfacing external digital audio equipment 100 with a host computer 120. The external digital audio equipment 100 can generally comprise any type of digital apparatus for receiving and/or transmitting digital audio data, including, for example, a compact disc player, a digital audio tape player (DAT), a digital sound sampler, a digital signal mixer, a digital musical instrument, a synthesizer, a digital audio sound VCR player, etc. The audio information generated by this equipment 100 may be in any form, including, but not limited to, audio data organized according to the AES standard, the IEC-958 standard, the EBU standard, the S/P-DIF standard, the $I^2S$ (Philips) standard, the IEEE P-1394 (FireWire) standard, or the EIAJ CP-340 standard. As discussed above, these protocols embed the audio stream with channel status information in a manner which may differ from one protocol to another.

The host unit 120 can comprise, for example, a general or special purpose microcomputer, such as one of the members of the Apple Macintosh™ family, which in turn comprises a processor 110 connected via common bus to a main memory 112, non-volatile memory (not shown), mass storage device 104, input/output interface circuitry 108, and various peripheries, such as a display unit 118, printer (not shown), keyboard 116, and cursor control device 114. An interface unit 102 interfaces the external audio equipment 100 with the host computer device 120. Although only a single input and output line have been shown connected to the interface unit 102, the interface unit 102 can accommodate plural inputs and outputs.

Figure 5:
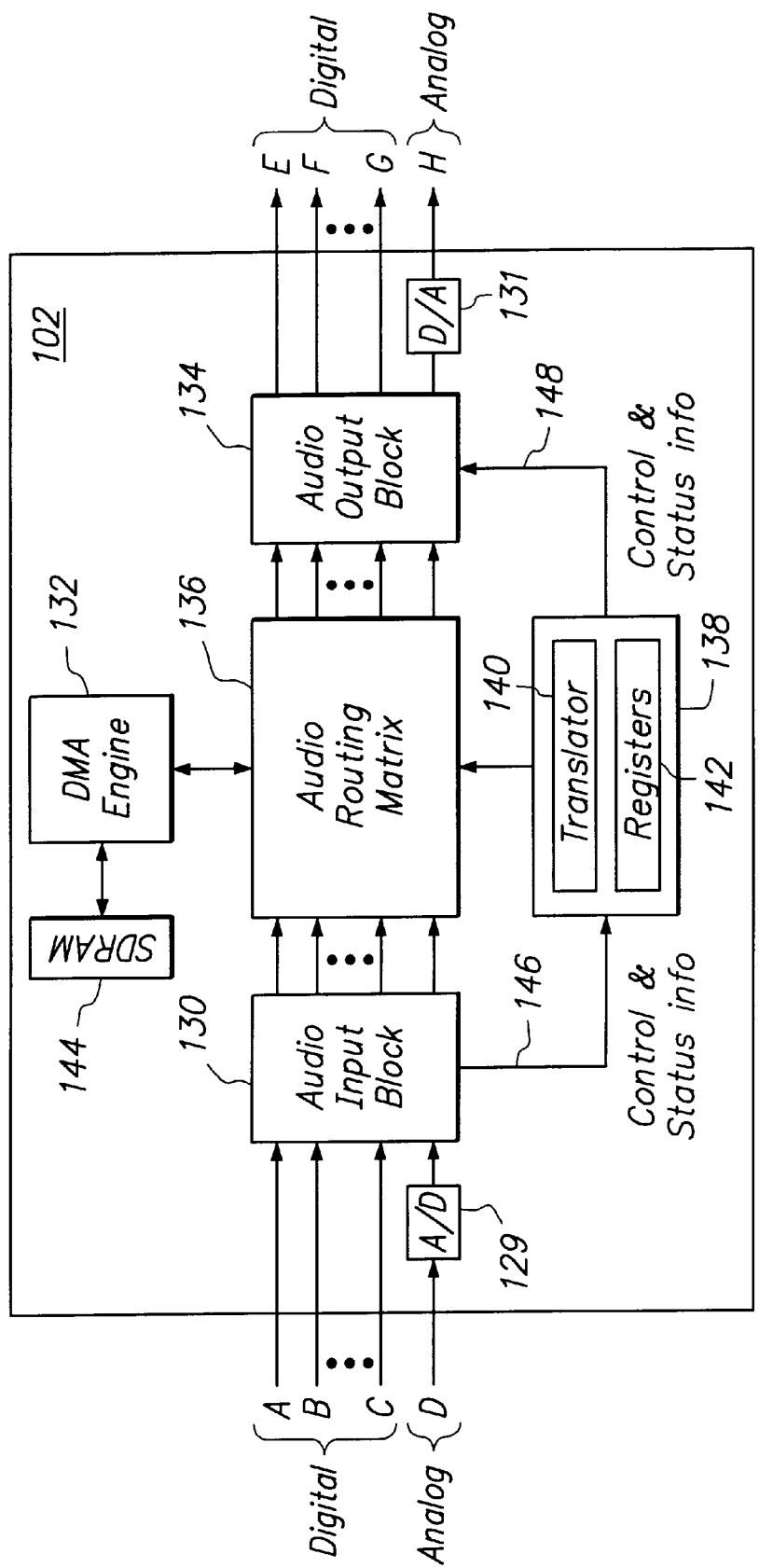
FIG. 5 shows a more detailed functional block depiction of the audio interface unit of FIG. 4.

FIG. 5 shows the interface unit 102 in greater detail. The interface unit 102 includes an audio input block 130 for receiving one or more inputs (e.g. inputs A–D). The audio input block is connected to routing matrix 136. The routing matrix 136, in turn, is connected to audio output block 134 which outputs audio information on one or more outputs (e.g. outputs E–H). The audio routing matrix 136 is connected to DMA engine 132, which stores and retrieves information in SDRAM 144. The audio routing matrix 136 is also connected to control unit 138 which contains a translator 140 for translating channel status information. The control unit 138 also includes one or more registers 142 containing information which governs the routing of audio data through the routing matrix 136 and the manner in which the channel status information is remapped.

At least one of the inputs to the interface unit 102 (e.g. input D) can be converted from analog form to digital form in A/D converter 129. The interface also includes at least one D/A converter 131 for converting information from digital form to analog form, and outputting the analog information on one or more output lines (e.g. output line H).

Those skilled in the art will appreciate that the interface unit 102 can be implemented as an interface card which interfaces with a general purpose computer and which communicates with the main bus of the general purpose computer via input/output circuitry, such as a serial input/output interface. The circuitry on the card can be implemented using one or more ASICs or programmable logic devices. Alternatively, the functional units shown in FIG. 5 can be implemented through software performed by a processing unit (not shown), or by some combination of hardware and software.

In operation, the interface unit 102 receives a digital bit stream of audio data on one of the input lines from a source, such as the external audio equipment 100. This information is then routed to the audio input block 130 which, among other tasks, strips the channel status information off the incoming bit stream and forwards this channel status information over line 146 to the control unit 138. At the control unit 138, the channel status information is remapped in translator 140 to provide a remapped set of auxiliary status bits defining the attributes of the audio data received. This translation function can be accomplished either in logic circuitry (such as an ASIC), via a processor executing software instructions, or through a combination of these or other techniques.

Generally speaking, the translator 140 translates the input channel status information into a uniform format regardless of the form of the original status channel block. The channel status information in the uniform format contains a super-set of data included in the channel status block of the original data and defines a "higher level" form of presentation than the original status information. In this sense, using OSI terminology, the translation of the original status block information into this "higher level" format can be viewed as imposing an additional layer on top of the physical layer and data link layer provided by the audio device. The remapping of channel status information can specifically be conceptualized as providing network and presentation layers to the preexisting physical and data link layers. Interested readers are referred to the publication "OSI: A Model for Computer Communications Standards", by Uyless Black (Prentice-Hall, Inc., 1991) for more details regarding the OSI standard, which publication is incorporated by reference here in its entirety.

The translated channel status information of the incoming bit stream is transmitted to audio output block 134 over line 148, where it is available to the host computer system 120 on one of the output lines (E–H). Since this data has been mapped into a format which is more directly useful to the application programs running on tie computer 120, the application programs can process the audio information with less computation, and therefore with more efficiency and speed. The time-consuming processing of a great deal of the raw channel status information has already been performed by hardware in the translator 140 of the control unit 138.

The audio portion of the incoming bit stream can be transferred to the host computer system 120 in various ways. According to a first technique, the digital audio portion of the incoming bit stream received from the external digital equipment 100 (or other source) is synchronized with the clock of the host computer system 120, and then transferred out to the host computer 120 through audio output block 134 and a selected one of the serial output lines (E–H). Synchronization is necessary in this mode of transfer because the incoming digital bit stream is synchronized with the clock of the external digital audio equipment 100 (or some other source), which will generally not coincide with the clock of the host computer 120.

A second technique for transferring the digital portion of the incoming bit stream to the host computer 120 involves transferring the digital audio portion (without the channel status information) to a SDRAM 144 via a DMA (direct memory access) engine 132. The digital information stored in the SDRAM 144 can then be retrieved from the SDRAM 144 via the audio output block 134 over one of the output lines (E–H). The information can then be transferred to the memory 112 (or internal hard disk, not shown) of the computer 120, where it can be processed in any manner desired. Depending on frequency of DMA transfer, this technique may or may not offer real-time transfer of information to the host computer 120, but may be preferred because it does not require re-synchronization of the incoming digital bit stream.

A third technique for transferring the incoming audio bit stream to the computer 120 involves directly routing the incoming audio data through the routing matrix 136 and then converting the digital bit stream from digital form to analog form in D/A converter 131, where it is then output on one of the output lines (e.g. output line H). The analog signal can be received by the computer 120, where it can be channeled to an output speaker for real-time monitoring of the input bit stream. This analog information can also be re-channeled into the interface circuit 102 via an input line (e.g. input line D), where the analog information is converted to digital form in A/D converter 129. The output of the A/D converter 129 can then be routed once again through the audio routing matrix 136, and then transferred to the computer 120 on one of the output lines. The digital information generated by the A/D converter 129 is synchronized with the clock of the computer CPU 110. Thus, like the first technique, this mode of transfer re-synchronizes an input digital bit stream with the clock of the computer 120. This mode of transfer may introduce some degradation in converting information from digital form to analog form, and then back to digital form, but is advantageous because it requires a minimum of software intervention and/or group delay.

According to exemplary embodiments, the computer system 120 or its peripheral circuitry can be used to select between the first, second, and third transfer techniques according to the needs of specific application programs running on the computer system 120.

The interface circuit 102 also serves to channel audio information received from the computer 120 to an external device, such as external digital audio equipment 100. In operation, the computer transfers the digital audio from a source within the computer (or external to the computer) and channels the audio data to audio input block 130. As before, the audio input block 130 strips the channel status information off (if the data contains channel status information) and the control unit 138 reformats the channel status data into a form which is compatible with the input form expected by the receiving external audio device (such as AES/EBU) with reference to status information stored in the control unit 138. The reformatted channel status information is "reassembled" with the audio portion of the input data bit stream in audio output block 134 and this data is channeled out to the receiving external audio equipment 100 through one of the output lines (e.g. output lines E–H).

The above discussion has been framed in the context of the transfer of information between an external digital audio device 100 and a computer 120, but the interface unit 102 can also be used in various other contexts. For instance, the interface unit 102 can be employed in a network environment to process digital information transmitted from a source computer to a destination terminal. In this context, the interface unit 102 can accept information in the source format and then translate the audio information to the destination format.

The control unit 138 controls the audio routing matrix 136 by reference to one or more control registers 142. Among other functions, the control unit 138 in conjunction with the control registers 142, determines what interface unit input mode is selected, and also what output mode is selected. The input source can be selected from the bit stream emanating from the external digital equipment 100 (expressed, for example, in AES format). The input source can also be taken from various input or output data streams associated with the computer system 120, providing "snoop on input" and "snoop on output", respectively, which will be described in greater detail later.

The control unit 138 in conjunction with the control registers 142 also defines the processing performed on an outgoing bit stream (e.g. a bit stream channeled from the computer 120 to the audio equipment 100 for recording). More precisely, the registers 142 include status registers which control the auxiliary status information which is transmitted along with the audio signal in the digital audio output bit stream. For example, when sending information out to an external digital audio equipment 100, the bits in these registers are automatically inserted into the bit stream in the channel status bit slot by the audio output block 134.

The contents of the control registers 142 can be set and/or interrogated through special command and/or inquiry messages received on one or more of the digital input lines (input lines A–D). A more detailed discussion of the functions performed by the control unit 138 in conjunction with the control registers 142 will follow in later sections.

In summary, the interface unit 102 can be conceptualized as a message routing network which channels selected inputs to selected outputs. The interface unit 102 also imposes an additional "layer" on top of the data link layer of the audio digital data. This additional layer provides a more efficient and standardized interface to application programs (the application layer) which process the audio information.

B. Communication of Status Information to the Host CPU in the Normal Mode

Figure 6:
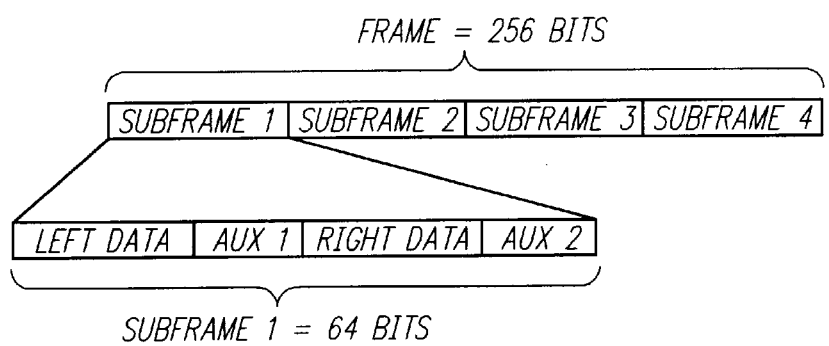
FIG. 6 shows an exemplary protocol for communicating with the audio interface unit of FIGS. 4 and 5.

Those skilled in the art will appreciate that there are different ways that the channel status information generated by the translator 140 (from the incoming channel status block received over one of the input lines A–D) can be communicated to the computer 120. An exemplary manner of presenting the status information to the computer is through the auxiliary data fields of the protocol identified in commonly assigned U.S. Pat. Nos. 5,532,556 and 5,557,044, which are both incorporated herein in their entirety by reference. With reference to FIG. 6, in this technique the data is into frames 256-bits long. Each frame is divided into four 64-bit sub-frames, and each subframe consists of a stereo pair of LEFT and RIGHT audio data of 20-bits each. Additionally, each subframe includes a total of 24 bits of auxiliary data, which, in turn, is parsed into AUX 1 and AUX 2. This auxiliary data includes the status data. The interface unit 102 of the present invention transmits status information to the computer 120 over one of the output lines in subframe 1 of the frame.

The particular bits within the serially transmitted subframe 1 are identified as follows. Those skilled in the art will appreciate that variations of this coding technique can be used.

| Subframe bit | Output Data (from the Interface Unit) |
|---|---|
| | Channel A |
| 0–19 | left input data (with bit 0 MSB) |
| 20 | extend bit |
| 21 | interface unit status (1 = operational) |
| 22 | channel status: consumer/pro |
| 23 | channel status: audio/non-audio |
| 24 | error No. bit # 3 (MSB) |
| 25 | error No. bit # 2 |

| Subframe bit | Output Data (from the Interface Unit) |
|---|---|
| 26 | error No. bit # 1 |
| 27 | error No. bit # 0 (LSB) |
| 28 | revision No. bit # 3 (MSB) |
| 29 | revision No. bit # 2 |
| 30 | revision No. bit # 1 |
| 31 | revision No. bit # 0 |
| | Channel B |
| 32–51 | right input data (with 32 MSB) |
| 52 | manufacturer's ID bit # 3 (MSB) |
| 53 | manufacturer's ID bit # 2 |
| 54 | manufacturer's ID bit # 1 |
| 55 | manufacturer's ID bit # 0 (LSB) |
| 56 | emphasis bit # 1 (MSB) |
| 57 | emphasis bit # 2 (LSB) |
| 58 | sample frequency bit # 1 (MSB) |
| 59 | sample frequency bit # 2 (LSB) |
| 60 | digital audio input stream present |
| 61 | [reserved for future use] |
| 62 | copyright asserted (consumer only) |
| 63 | first generation original (consumer only) |

As previously discussed, there are plural ways of transferring information from the external audio equipment 100 to the computer 120, including: a) re-synchronizing the incoming information from the audio equipment 100 to coincide with the clock rate of the computer 120; and b) storing the incoming information from the audio equipment 100 in the SDRAM and transferring the information to the computer via DMA (direct memory access) transfer. In the first mode of transfer, bits 0–19 and 32–51 carry the audio portion of the subframe. In the second mode of transfer, bits 0–19 and 32–51 are set to zero. The bits in the auxiliary fields are described as follows.

The "extend bit" (bit 20) defines whether the interface is responding to a special expanded register read/write mode. More specifically, as will be described in greater detail in the next section, the computer 120 can interrogate the contents of the registers 142 or set the contents of the registers 142 through an "expanded" mode transmission to the interface circuit 102 which includes an "expand bit" to characterize this transmission. The interface unit will respond to the expanded mode transmission with an "extended" mode reply. The "extend bit" identifies whether the interface unit 102 is responding to such an expanded mode transmission from the computer 120. The interface unit 102 also can generate an extended transmission in other circumstances, such as the occurrence of certain error conditions.

The next bit (bit 21) identifies whether the interface unit is functional or not (where a value of "1" indicates that the interface unit has finished initialization and is operational).

The next bit (bit 22) indicates whether the audio information is in consumer mode or professional mode, and the next bit (bit 23) defines whether the incoming data is audio data or non-audio data.

The error codes (bits 24–27) are organized to reflect increasing levels of severity of errors detected in the received bit stream. In the case of multiple simultaneous error conditions, the more severe error will take precedence. By way of example, the error codes can comprise: code 0000 representing normal operation (no error detected); code 0001 representing invalid data in an expanded data mode message (defined later); code 0010 representing incorrect frame sync pulse format; code 0011 representing invalid audio data; code 0100 representing a bad AES/EBU (or other protocol) frame sync pulse (e.g. caused by a bad cable); code 0101 representing AES/EBU (or other protocol) parity error; code 0110 representing incorrect AES/EBU (or other protocol) frame sync pulse format; and code 0111 representing a CRC error. Other error codes can be reserved for later modification and improvements to the protocol. Of course, the binary codes assigned to these error conditions are not critical, and other codes can be used.

The revision No. bit field (bits 28–31) can be used to convey a code representing the type of interface 102 which is transmitting the data. Likewise, the manufacturer ID field (bits 53–55) can be used to convey a code representing the manufacturer of the interface 102. This information is added to the auxiliary data by the translator 140.

The emphasis coding bits (56 and 57) describe whether or not the incoming digital audio has been subject to a preemphasis before transmission. If either of these bits are "1" then the preemphasis must be "reversed" before using the audio data in further processing steps. The consumer mode digital audio, for example, permits only 50/15 µs preemphasis.

The sample rate field (bits 58 and 59) describes the sample frequency of the incoming bit stream. More specifically, these bits represent the frequency of the serial data transmission, rather than the codes contained in the channel status bit field (e.g. in the AES/EBU or IEC-958 standards). According to exemplary embodiments, the sample frequency coding may comprise: code 00 representing a frequency of 44.1 kHz; code 01 representing a frequency of 48.0 kHz; code 10 representing a frequency of 32.0 kHz; and code 11 representing an unspecified or out-of-range frequency. That is, if the incoming bit stream is not one of the standard sample rates, this field is set to 11.

The digital audio input stream present flag (bit 60) indicates whether or not a transmission is detected from the external digital audio equipment 100 to the interface unit 102. This flag is set to a default state when no bit stream is detected.

Finally, the copyright asserted (consumer use only) and first generation original (consumer use only) define whether digital copying is permitted and whether the incoming bit stream is a copy or an original. This information can be directly used by an application program without having to consider other permutations of channel status information, unlike the prior art discussed above.

C. Register Read and Write Operations

In the "normal" mode described above, a fixed auxiliary data field can be transmitted from the interface unit 102 to the host 120 once every frame during the portion of an active subframe which does not carry audio. The interface unit 102 also supports an expanded mode of communicating with the interface unit 102, which allows the host to selectively read from and write to addresses in the registers 142. This technique is discussed in commonly assigned U.S. Pat. No. 5,577,044. By way of summary, this exemplary input protocol for the expanded mode is defined as follows:

| Subframe bit | Input Data (to the Interface Unit) |
|---|---|
| 0–19 | left D/A data bits (with 0 MSB) |
| 20 | expand bit (=1) |
| 21 | command bit |
| 22–31 | expanded mode address (with 22 MSB) |
| 32–51 | right D/A data bits (with 32 MSB) |
| 52–63 | expanded mode data (with 52 MSB) |

In the expanded mode (identified by bit 20 set to "1"), the command bit (bit 21) indicates whether the expanded mode message sent to the interface unit 102 is a data request (bit 21="0") or a data command (e.g. register write) (bit 21="1"). In the data request mode (bit 21="0"), the message is a request to read out the contents of a register entry stored at the address specified in bits 22–31. The interface unit 102 will respond in the following frame with the requested data taken from the addressed register entry. In this following frame, the extended data address bits (subframe bits 22–31) will echo the data address, confirming that the interface unit 102 retrieved the correct data from the register entry location. If the receiver can not respond correctly to the data request, then it will return an error code (as discussed above).

If the command bit is set to a value of "1", then the appropriate internal register 142 in the control unit 138 will be updated to a new data value specified in the bits 52–63. The register is updated in the next frame following the command. As before, if the interface unit 102 can not respond, then it will report back an error. For a register read operation (bit 21="0"), bits 52–63 are ignored by the interface unit 102.

D. Register Bit Assignments

Those skilled in the art will appreciate that the above-described expanded mode read and write functions can be used in conjunction with any type of register organization. The following discussion presents one such exemplary register organization, identifying the contents of the registers. As described above, the registers 142 are used by the control unit 138 in defining and controlling the functional attributes of the interface unit 102, and in defining the channel status information transmitted from the interface unit 102. The exemplary embodiment discussed below employs five registers, each having 12 bits of data. The first register (at address 0) is used to control the interrupts generated by the interface circuit 102. The second register (at address 1) is used to control the signal routing performed by the interface unit 102. The third through fifth registers provide status information which can be interrogated or set by the computer 120. The locations in the registers are referred to as "cells". Cell 0 is the least significant bit of the registers, while cell 12 is the most significant bit of the registers.

According to one exemplary aspect of the invention, the organization and definition of the register contents remain fixed regardless of the format of the status information being transmitted or received by the interface unit 102. As such, the registers contain various fields or bits which might not apply to various format modes, such that these fields do not contribute to formation of an outgoing channel status block. This uniformity in register definition markedly departs from the prior art characterized above, which typically redefined the contents of its registers and activated and deactivated various circuit modules depending on the protocol in use.

The exemplary contents of the five registers will be discussed in further detail below.

| Register 1 for Interrupt Control | |
|---|---|
| Cell | Description |
| 11 | mask interrupt to computer |
| 10 | mask interrupt to DMA engine |
| 9 | mask interrupt when error occurs in input |
| 8 | interrupt upon change in RX user data |
| 7 | interrupt upon change in RX channel status |
| 6 | interrupt on TX user data block boundary |

-continued

Register 1 for Interrupt Control

| Cell | Description |
|---|---|
| 5 | interrupt on TX channel status block boundary |
| 4–0 | reserved for future use |

Register cell 11 determines whether the interrupts generated by the interface circuit 102 to the computer's CPU 110 are masked, while register cell 10 determines whether interrupts generated by the interface circuit 102 to the internal DMA engine 132 are masked. Writing a value of "1" to either bit will enable the propagation of interrupts to the proper destination.

The next cell (cell 9) determines whether an interrupt is generated by the interface circuit 102 when an error occurs in the incoming AES/EBU or S/P-DIF (or other protocol) digital audio bit stream (e.g. received from the external digital equipment 100).

The next series of cells (8–7) determine whether an interrupt is triggered upon the occurrence of a change in the incoming audio data, including a change in the user data contained in an incoming bit stream (cell 8), and a change in the channel status data of the incoming bit stream (cell 7). For instance, cell 7 can enable or disable the generation of an interrupt when the preemphasis status or copyright status in an incoming digital audio bit stream changes (as indicated by a change in the respective emphasis and copyright bit or bits in the incoming bit stream). Writing a "0" to the bits in these registers will clear all pending interrupts as well as prevent any future interrupts from occurring from the above-identified set of sources (but will not mask all interrupts generated by the interface 102). If an interrupt has appeared, it must be cleared before returning from the interrupt handler. This is accomplished by reading the appropriate register using the expanded mode register read technique discussed above.

Cell 6 determines whether an interrupt is generated when a boundary in a user data block is encountered, and cell 5 determines whether an interrupt is generated when a boundary in a channel status block is encountered. Different techniques for detecting the boundary of a block can be used. For instance, the boundary of a channel status block can be detected with reference to cell 10 of register 3, to be described below.

Register bits 4–0 are reserved for future bit assignments. Those skilled in the art will recognize that larger registers can be used to accommodate more interrupt-related flags, if required by the particular application. Furthermore, those skilled in the art will realize that the organization of information in the registers is strictly exemplary, and that other formats will suffice.

Register 2 for Audio Routing

| Cell | Description |
|---|---|
| 11–10 | select output source |
| 9–8 | select output clock source |
| 7–6 | select snoop subframe |
| 5–4 | select re-synchronized data subframe |
| 3–0 | reserved for future use |

This register controls the digital audio output signal routing. The first two cells (cells 11 and 10) specify which audio data bit stream is used to send out the interface unit's audio output to external equipment (such as device 100). These cells define four possible conditions (e.g. corresponding to binary codes 00, 01, 10 and 11). In two of these conditions, data can be respectively selected from various output or input streams associated with the computer 120, thereby providing a "snoop on output" or a "snoop on input". In the snoop on output case, for example, the input source to the interface 102 can be selected from information output by the computer 120 to such destinations as the computer's internal speakers (not shown), headphones (not shown), etc. In the snoop on input case, the input source can be selected from information generated by various A/D converters (not shown) associated with the computer 120. This information includes, for example, information coming "into" the computer from external microphones (not shown), internal CD-ROMs (not shown), etc. According to the third condition, data is selected from an external audio device. The fourth possible condition of these two cells is used to indicate that the audio data field is unused (i.e. the output is forced to a quiescent state).

The next two cells (cells 9 and 8) determine which source is used as a time base to clock the bit stream out of the interface unit 102. This field pertains to the mode discussed above in which an input audio bit stream is converted from the clock rate of the originating digital equipment 100 to the clock rate of the computer CPU 110. This field defines what reference should be used to perform this re-synchronization.

The next two cells (cells 7 and 6) define which input or output subframe the interface unit 102 receives data from. As explained in the previous patents referenced above, different audio modules associated with the computer 120 can be configured to process different subframes of data. Or, in other words, different modules are "tuned" to different subframes. Therefore, by selecting a particular subframe, the interface circuit can sample and output the information transmitted to or received from a selected module.

The last two non-reserved cells (cells 5 and 4) define which subframe is used to transmit audio data to the computer 120, where the audio data has been re-synchronized to the clock of the computer 120 in accordance with the above discussed "first transfer technique".

Register 3 Containing Status Information

| Cell | Description |
|---|---|
| 11 | reserved for future use |
| 10 | channel status bit block boundary |
| 9–7 | reserved for future use |
| 6–5 | audio channel encoding mode select |
| 4–0 | reserved for further use |

Registers 3–5 generally are used to control the auxiliary status information which is transmitted along with the audio signal in the digital audio output bit stream. These bits are automatically inserted into the AES/EBU (or some other format) bit stream in the channel status bit slot by the output block 134.

Cell 10 of register 3 shown above is used to delineate the channel status bit block boundary. When the contents of this cell are set to "1" by a write to this register in the expanded mode, a "1" will be transmitted until a full channel status block has passed (192 frames in, for example, the AES standard), at which point a "0" will be transmitted. This feature facilitates the setting of channel status bits which must change on a block by block basis (such as a time code).

Cells 6 and 5 are used to specify the audio channel encoding mode. For example, a code of 00 can be used to identify stereo left/right pair mode. A code of 01 can identify that the digital audio stream is specified as monophonic, with the right channel containing unknown data (if any). This format is typically used for studio "house sync" applications, where the sole purpose of the digital audio link is to distribute a timing reference to all of the receivers in the studio. When this field is set to codes 10 or 11, the link is set to indicate a "dual-speed mono" data stream, with the data contained in the bit stream designated as either left or right channel data, respectively. This mode is typically used for 96 kHz data links where a pair of AES/EBU outputs are used to transmit stereo data at double the "natural" rate.

| Register 4 Containing Status Information | |
|---|---|
| Cell | Description |
| 11–8 | frequency information |
| 7 | consumer/pro |
| 6 | audio/data |
| 5–4 | emphasis |
| 3–0 | reserved for future use |

Cells 11–8 define the sample frequency indication which is transmitted in the channel status block. More precisely, this field can include one or more bits which define the original audio sample rate which is embedded in the channel status block. Note that this may not have any impact on the actual timing of the bits which are transmitted out from the interface unit 102. This field simply indicates the original sample rate of the data contained in the bit stream. Thus, one could have a digital bit stream which is transmitted at 48 kHz, but whose channel status block indicates that the original sample rate is 44.1 kHz. This dichotomy occurs with some devices which require that the actual bit stream be clocked out at a rate which is synchronized with another signal (such as a video clock). Other bits in this frequency field can indicate whether the sample rate information is to be used "as is", or altered (for instance by multiplying the sample frequency by 2, such that a sample frequency of 48 kHz becomes 96 kHz, or by multiplying the sample frequency by 0.99 to accommodate video-locked audio rates such as 44.056 kHz).

Cell 7 controls whether the output data bit stream should be formatted in a professional mode or consumer mode.

Cell 6 is used to specify whether the receiving device (e.g. audio equipment 100) is supposed to interpret the digital audio bit stream as linear PCM data (set to "0") or some other encoded data, such as a 6-channel Dolby AC-3 compressed bit stream (when set to "1").

Cells 5–4 control whether the output data bit stream should be formatted with or without emphasis.

| Register 5 Containing Status Information | |
|---|---|
| Cell | Description |
| 11 | mono/stereo |
| 10–9 | output word length |
| 8–6 | category code |
| 5 | copy_ok/protected |
| 4 | copy/original |

In the last register, cell 11 communicates whether the audio bit stream is a monophonic or stereo bit stream. Cells 10–9 define the output word length, and can contain: code 00 to indicate a length of 16 bits; code 01 to indicate a length of 18 bits; code 10 to indicate a length of 20 bits; and code 11 to indicate a length of 24 bits. Cells 8–6 are used to identify the type of equipment from which the digital audio bit steam originates. These cells can contain: code 000 to indicate a general device; code 010 to indicate a digital converter; code 100 to indicate a laser optical device; and code 110 to indicate a magnetic tape or disk.

Cell 5 is used to indicate that the current digital audio bit stream is commercial in nature, and it is thus protected under copyright laws. The next bit is used to determine whether the current bit stream represents original information, or if it is a second generation digital copy of a copyrighted bit stream.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

What is claimed is:

1. An interface circuit for receiving serial audio digital data and reformatting the audio digital data to a uniform format, comprising:
   an input circuit for receiving input audio digital data from at least one input line, identifying channel status information in the received audio digital data and separating the channel status information from the input audio digital data;
   a control circuit for modifying the separated channel status information to generate modified channel status information conforming to said uniform format; and
   an output circuit for transmitting said modified channel status information to an external device.

2. The interface circuit of claim 1, further including:
   an audio routing matrix for channeling a portion of said input digital audio data from said input circuit to said output circuit.

3. The interface circuit of claim 2, wherein said channeling performed by said audio routing matrix is governed by control information stored within said control circuit.

4. The interface circuit of claim 1, wherein said control circuit includes at least one register including memory cells for defining the manner in which said interface circuit operates.

5. The interface circuit of claim 4, wherein the contents of said at least one register can be interrogated by transmitting an interrogation message to said at least one register.

6. The interface circuit of claim 4, wherein the contents of said at least one register can be set by transmitting a write command to said at least one register.

7. The interface circuit of claim 1, wherein said output circuit assembles the modified channel status information with an audio portion of said audio digital data.

8. A method for receiving serial audio digital data and reformatting the audio digital data to a uniform format, comprising:
   receiving input audio digital data from at least one input line;
   identifying channel status information within said input audio digital data;

separating said channel status information from said input audio digital data;

modifying the separated channel status information to generate modified channel status information conforming to said uniform format; and transmitting said modified channel status information to an external device.

9. The method of claim 8, further including the step of:

channeling a portion of said input digital audio data from said input circuit to said output circuit.

10. The method of claim 9, wherein said channeling is governed by control information stored in a control circuit having at least one register.

11. The method of claim 8, wherein said identifying and modifying step is controlled by information stored in a control circuit having at least one register.

12. The method of claim 11, further including a step of interrogating the contents of said at least one register by transmitting an interrogating command to said at least one register.

13. The method of claim 8, further comprising:

assembling the modified channel status information with an audio portion of said audio digital data.

14. The method of claim 11, further including a step of setting the contents of said at least one register by transmitting a write command to said at least one register.

15. An electronic system for processing serial audio digital data, comprising:

an input device for receiving serial audio digital data in a data link layer format;

a translator for remapping said received serial audio data into a uniform level format that comprises a superset of said serial audio digital data; and an output device for outputting said serial audio data which has been converted to said higher level layer format.

16. An interface circuit for outputting a stream of digital audio data, comprising:

an input circuit for receiving input audio digital data from at least one input line;

a control circuit providing at least one control register containing status information therein, wherein the contents of said control register can be interrogated by transmitting an interrogation message to said register; and an output circuit for receiving said input audio digital data and said status information from said control register, for combining said input audio digital data with said status information to produce output data, and for transmitting said output data to an external device.

17. An interface circuit for outputting a stream of digital audio data, comprising:

an input circuit for receiving input audio digital data from at least one input line;

a control circuit providing at least one control register containing status information therein, wherein the contents of said control register can be set by transmitting a write command to said register; and an output circuit for receiving said input audio digital data and said status information from said control register, for combining said input audio digital data with said status information to produce output data, and for transmitting said output data to an external device.

18. An interface circuit for outputting a stream of digital audio data, comprising:

an input circuit for receiving input audio digital data from at least one input line;

a control circuit for providing at least one control register containing status information therein, wherein said control register contains control fields, and wherein a same set and organization of control fields supplies status information for plural output format protocols; and an output circuit for receiving said input audio digital data and said status information from said control register, for combining said input audio digital data with said status information to produce output data, and for transmitting said output data to an external device.

19. A method for outputting a stream of digital audio data, comprising the steps of:

receiving input audio digital data from at least one input line;

accessing at least one control register containing status information therein;

interrogating the contents of said control register by transmitting an interrogating command to said register;

receiving said input audio digital data and said status information from said control register;

combining said input audio digital data with said status information to produce output data, and transmitting said output data to an external device.

20. A method for outputting a stream of digital audio data, comprising the steps of:

receiving input audio digital data from at least one input line;

accessing at least one control register containing status information therein;

setting the contents of said register by transmitting a write command to said control register;

receiving said input audio digital data and said status information from said control register;

combining said input audio digital data with said status information to produce output data; and transmitting said output data to an external device.

21. A method for outputting a stream of digital audio data, comprising the steps of:

receiving input audio digital data from at least one input line;

accessing at least one control register containing status information therein, wherein said control register contains control fields, and wherein a same set and organization of control fields supplies status information for plural output format protocols;

receiving said input audio digital data and said status information from said control register;

combining said input audio digital data with said status information to produce output data; and transmitting said output data to an external device.

* * * * *